(12) United States Patent
Sanders

(10) Patent No.: US 12,544,674 B2
(45) Date of Patent: Feb. 10, 2026

(54) SYSTEM AND METHOD FOR USING ROOM-SCALE VIRTUAL SETS TO DESIGN VIDEO GAMES

(71) Applicant: Activision Publishing, Inc., Santa Monica, CA (US)

(72) Inventor: Michael Sanders, San Luis Obispo, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 520 days.

(21) Appl. No.: 18/068,603

(22) Filed: Dec. 20, 2022

(65) Prior Publication Data
US 2023/0191259 A1 Jun. 22, 2023

Related U.S. Application Data

(60) Provisional application No. 63/265,749, filed on Dec. 20, 2021.

(51) Int. Cl.
*A63F 13/65* (2014.01)
*A63F 13/212* (2014.01)
*A63F 13/25* (2014.01)

(52) U.S. Cl.
CPC ............ *A63F 13/65* (2014.09); *A63F 13/212* (2014.09); *A63F 13/25* (2014.09)

(58) Field of Classification Search
CPC ........ A63F 13/65; A63F 13/212; A63F 13/25; A63F 13/27; A63F 13/213; A63F 13/428; A63F 13/5258
See application file for complete search history.

(56) References Cited

U.S. PATENT DOCUMENTS 5,530,796 A 6/1996 Wang
5,561,736 A 10/1996 Moore
(Continued)

FOREIGN PATENT DOCUMENTS

AU 768367 3/2004
AU 2005215048 10/2011
(Continued)

OTHER PUBLICATIONS

Huang, Liang, "A Method of Speed Control during Over-ground Walking: Using a Digital Light-Emitting Diode Light Strip", Trans Tech Publications, 2013 (Year: 2013).
(Continued)

*Primary Examiner* — Carl V Larsen
(74) *Attorney, Agent, or Firm* — Novel IP

(57) ABSTRACT

A system adapted to generate video game content by real-time modifying a virtual background displayed on a display wall from a perspective of a physical actor is described. A first set of motion capture tracking sensors, coupled to the physical actor, is used to generate a first set of motion capture data. A first computing engine receives the first set of motion capture data and determines a first field of view of the physical actor based at least in part on the first set of motion capture data. A display wall projection system, that is at least 60 feet wide and 18 feet tall, defines a second field of view that is larger than the first field of view. A second computing engine configured generates video game content for display and transmits the video game content to the display wall projection system. The first computing engine transmits the first field of view to the second computing engine which then generates a first set of changes to the video game content transmitted to the display wall projection system based on the first field of view.

14 Claims, 9 Drawing Sheets

(56) References Cited

U.S. PATENT DOCUMENTS

| | | | |
|---|---|---|---|
| 5,563,946 A | 10/1996 | Cooper | |
| 5,685,775 A | 11/1997 | Bakoglu | |
| 5,706,507 A | 1/1998 | Schloss | |
| 5,708,764 A | 1/1998 | Borrel | |
| 5,736,985 A | 4/1998 | Lection | |
| 5,737,416 A | 4/1998 | Cooper | |
| 5,745,678 A | 4/1998 | Herzberg | |
| 5,768,511 A | 6/1998 | Galvin | |
| 5,790,124 A * | 8/1998 | Fischer | G06T 15/10 |
| | | | 472/75 |
| 5,825,877 A | 10/1998 | Dan | |
| 5,835,692 A | 11/1998 | Cragun | |
| 5,878,233 A | 3/1999 | Schloss | |
| 5,883,628 A | 3/1999 | Mullaly | |
| 5,900,879 A | 5/1999 | Berry | |
| 5,903,266 A | 5/1999 | Berstis | |
| 5,903,271 A | 5/1999 | Bardon | |
| 5,911,045 A | 6/1999 | Leyba | |
| 5,920,325 A | 7/1999 | Morgan | |
| 5,923,324 A | 7/1999 | Berry | |
| 5,969,724 A | 10/1999 | Berry | |
| 5,977,979 A | 11/1999 | Clough | |
| 5,990,888 A | 11/1999 | Blades | |
| 6,014,145 A | 1/2000 | Bardon | |
| 6,025,839 A | 2/2000 | Schell | |
| 6,059,842 A | 5/2000 | Dumarot | |
| 6,069,632 A | 5/2000 | Mullaly | |
| 6,081,270 A | 6/2000 | Berry | |
| 6,081,271 A | 6/2000 | Bardon | |
| 6,091,410 A | 7/2000 | Lection | |
| 6,094,196 A | 7/2000 | Berry | |
| 6,098,056 A | 8/2000 | Rusnak | |
| 6,104,406 A | 8/2000 | Berry | |
| 6,111,581 A | 8/2000 | Berry | |
| 6,134,588 A | 10/2000 | Guenthner | |
| 6,144,381 A | 11/2000 | Lection | |
| 6,148,328 A | 11/2000 | Cuomo | |
| 6,185,614 B1 | 2/2001 | Cuomo | |
| 6,201,881 B1 | 3/2001 | Masuda | |
| 6,222,551 B1 | 4/2001 | Schneider | |
| 6,271,842 B1 | 8/2001 | Bardon | |
| 6,271,843 B1 | 8/2001 | Lection | |
| 6,282,547 B1 | 8/2001 | Hirsch | |
| 6,311,206 B1 | 10/2001 | Malkin | |
| 6,334,141 B1 | 12/2001 | Varma | |
| 6,336,134 B1 | 1/2002 | Varma | |
| 6,337,700 B1 | 1/2002 | Kinoe | |
| 6,353,449 B1 | 3/2002 | Gregg | |
| 6,356,297 B1 | 3/2002 | Cheng | |
| 6,411,312 B1 | 6/2002 | Sheppard | |
| 6,426,757 B1 | 7/2002 | Smith | |
| 6,445,389 B1 | 9/2002 | Bossen | |
| 6,452,593 B1 | 9/2002 | Challener | |
| 6,462,760 B1 | 10/2002 | Cox, Jr. | |
| 6,469,712 B1 | 10/2002 | Hilpert, Jr. | |
| 6,473,085 B1 | 10/2002 | Brock | |
| 6,499,053 B1 | 12/2002 | Marquette | |
| 6,505,208 B1 | 1/2003 | Kanevsky | |
| 6,525,731 B1 | 2/2003 | Suits | |
| 6,549,933 B1 | 4/2003 | Barrett | |
| 6,567,109 B1 | 5/2003 | Todd | |
| 6,618,751 B1 | 9/2003 | Challenger | |
| RE38,375 E | 12/2003 | Herzberg | |
| 6,657,617 B2 | 12/2003 | Paolini | |
| 6,657,642 B1 | 12/2003 | Bardon | |
| 6,684,255 B1 | 1/2004 | Martin | |
| 6,717,600 B2 | 4/2004 | Dutta | |
| 6,734,884 B1 | 5/2004 | Berry | |
| 6,765,596 B2 | 7/2004 | Lection | |
| 6,781,607 B1 | 8/2004 | Benham | |
| 6,819,669 B2 | 11/2004 | Rooney | |
| 6,832,239 B1 | 12/2004 | Kraft | |
| 6,836,480 B2 | 12/2004 | Basso | |
| 6,886,026 B1 | 4/2005 | Hanson | |
| 6,948,168 B1 | 9/2005 | Kuprionas | |
| RE38,865 E | 11/2005 | Dumarot | |
| 6,993,596 B2 | 1/2006 | Hinton | |
| 7,028,296 B2 | 4/2006 | Irfan | |
| 7,062,533 B2 | 6/2006 | Brown | |
| 7,143,409 B2 | 11/2006 | Herrero | |
| 7,209,137 B2 | 4/2007 | Brokenshire | |
| 7,230,616 B2 | 6/2007 | Taubin | |
| 7,249,123 B2 | 7/2007 | Elder | |
| 7,263,511 B2 | 8/2007 | Bodin | |
| 7,287,053 B2 | 10/2007 | Bodin | |
| 7,305,438 B2 | 12/2007 | Christensen | |
| 7,308,476 B2 | 12/2007 | Mannaru | |
| 7,404,149 B2 | 7/2008 | Fox | |
| 7,426,538 B2 | 9/2008 | Bodin | |
| 7,427,980 B1 | 9/2008 | Partridge | |
| 7,428,588 B2 | 9/2008 | Berstis | |
| 7,429,987 B2 | 9/2008 | Leah | |
| 7,436,407 B2 | 10/2008 | Doi | |
| 7,439,975 B2 | 10/2008 | Hsu | |
| 7,443,393 B2 | 10/2008 | Shen | |
| 7,447,996 B1 | 11/2008 | Cox | |
| 7,467,181 B2 | 12/2008 | McGowan | |
| 7,475,354 B2 | 1/2009 | Guido | |
| 7,478,127 B2 | 1/2009 | Creamer | |
| 7,484,012 B2 | 1/2009 | Hinton | |
| 7,503,007 B2 | 3/2009 | Goodman | |
| 7,506,264 B2 | 3/2009 | Polan | |
| 7,515,136 B1 | 4/2009 | Kanevsky | |
| 7,525,964 B2 | 4/2009 | Astley | |
| 7,552,177 B2 | 6/2009 | Kessen | |
| 7,565,650 B2 | 7/2009 | Bhogal | |
| 7,571,224 B2 | 8/2009 | Childress | |
| 7,571,389 B2 | 8/2009 | Broussard | |
| 7,580,888 B2 | 8/2009 | Ur | |
| 7,596,596 B2 | 9/2009 | Chen | |
| 7,640,587 B2 | 12/2009 | Fox | |
| 7,667,701 B2 | 2/2010 | Leah | |
| 7,698,656 B2 | 4/2010 | Srivastava | |
| 7,702,784 B2 | 4/2010 | Berstis | |
| 7,714,867 B2 | 5/2010 | Doi | |
| 7,719,532 B2 | 5/2010 | Schardt | |
| 7,719,535 B2 | 5/2010 | Tadokoro | |
| 7,734,691 B2 | 6/2010 | Creamer | |
| 7,737,969 B2 | 6/2010 | Shen | |
| 7,743,095 B2 | 6/2010 | Goldberg | |
| 7,747,679 B2 | 6/2010 | Galvin | |
| 7,765,478 B2 | 7/2010 | Reed | |
| 7,768,514 B2 | 8/2010 | Pagan | |
| 7,773,087 B2 | 8/2010 | Fowler | |
| 7,774,407 B2 | 8/2010 | Daly | |
| 7,782,318 B2 | 8/2010 | Shearer | |
| 7,792,263 B2 | 9/2010 | D Amora | |
| 7,792,801 B2 | 9/2010 | Hamilton, II | |
| 7,796,128 B2 | 9/2010 | Radzikowski | |
| 7,808,500 B2 | 10/2010 | Shearer | |
| 7,814,152 B2 | 10/2010 | McGowan | |
| 7,827,318 B2 | 11/2010 | Hinton | |
| 7,843,471 B2 | 11/2010 | Doan | |
| 7,844,663 B2 | 11/2010 | Boutboul | |
| 7,847,799 B2 | 12/2010 | Taubin | |
| 7,856,469 B2 | 12/2010 | Chen | |
| 7,873,485 B2 | 1/2011 | Castelli | |
| 7,882,222 B2 | 2/2011 | Dolbier | |
| 7,882,243 B2 | 2/2011 | Ivory | |
| 7,884,819 B2 | 2/2011 | Kuesel | |
| 7,886,045 B2 | 2/2011 | Bates | |
| 7,890,623 B2 | 2/2011 | Bates | |
| 7,893,936 B2 | 2/2011 | Shearer | |
| 7,904,829 B2 | 3/2011 | Fox | |
| 7,921,128 B2 | 4/2011 | Hamilton, II | |
| 7,940,265 B2 | 5/2011 | Brown | |
| 7,945,620 B2 | 5/2011 | Bou-Ghannam | |
| 7,945,802 B2 | 5/2011 | Hamilton, II | |
| 7,970,837 B2 | 6/2011 | Lyle | |
| 7,970,840 B2 | 6/2011 | Cannon | |
| 7,985,138 B2 | 7/2011 | Acharya | |
| 7,990,387 B2 | 8/2011 | Hamilton, II | |
| 7,996,164 B2 | 8/2011 | Hamilton, II | |
| 8,001,161 B2 | 8/2011 | George | |

(56) References Cited

U.S. PATENT DOCUMENTS

| | | |
|---|---|---|
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,964,052 B1 | 2/2015 | Wooley |
| 8,992,316 B2 | 3/2015 | Smith |
| 9,067,116 B1 | 6/2015 | Heikenen |
| 9,083,654 B2 | 7/2015 | Dawson |
| 9,092,953 B1 | 7/2015 | Mortimer |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,645,646 B2 | 5/2017 | Cowley |
| 9,682,324 B2 | 6/2017 | Bansi |
| 9,699,278 B2 | 7/2017 | Richley |
| 9,759,803 B2 | 9/2017 | O'Hagan |
| 9,764,244 B2 | 9/2017 | Bansi |
| 9,789,406 B2 | 10/2017 | Marr |
| 9,808,722 B2 | 11/2017 | Kawachiya |
| 10,321,873 B2 | 6/2019 | Connor |
| 10,373,342 B1* | 8/2019 | Perez, III ............... G06F 3/011 |
| 10,403,050 B1 | 9/2019 | Beall |
| 10,437,658 B2 | 10/2019 | Alonso |
| 10,602,200 B2 | 3/2020 | Grant |
| 10,716,510 B2 | 7/2020 | Connor |
| 10,796,489 B1* | 10/2020 | Cordes .................. A63F 13/213 |
| 11,107,195 B1* | 8/2021 | Cordes ..................... G06T 7/90 |
| 11,113,892 B2 | 9/2021 | Rozenblit |
| 2006/0017654 A1 | 1/2006 | Romo |
| 2007/0217209 A1 | 9/2007 | Wong |
| 2009/0113448 A1 | 4/2009 | Smith |
| 2009/0324017 A1 | 12/2009 | Gordon |
| 2010/0026809 A1 | 2/2010 | Curry |
| 2011/0115709 A1 | 5/2011 | Cruz-Hernandez |
| 2014/0344725 A1 | 11/2014 | Bates |
| 2015/0350628 A1 | 12/2015 | Sanders |
| 2016/0191671 A1 | 6/2016 | Dawson |
| 2016/0252326 A1 | 9/2016 | Jones |
| 2017/0064295 A1* | 3/2017 | Stolzberg ................ E04H 3/22 |
| 2017/0312614 A1 | 11/2017 | Tran |
| 2019/0227419 A1* | 7/2019 | Mcnelley ............. H04N 9/3182 |
| 2019/0291277 A1 | 9/2019 | Oleynik |
| 2020/0020165 A1 | 1/2020 | Tran |
| 2020/0142663 A1* | 5/2020 | Chang ..................... G06F 3/147 |
| 2020/0297262 A1 | 9/2020 | Chappell, III |
| 2022/0107415 A1* | 4/2022 | Remelius ............. A61B 5/6826 |
| 2022/0180664 A1* | 6/2022 | Crosby ............. H04N 21/8547 |
| 2022/0343590 A1* | 10/2022 | Jutan ................... G06F 3/04847 |

(56) References Cited

U.S. PATENT DOCUMENTS

| | | | | |
|---|---|---|---|---|
| 2022/0343591 | A1* | 10/2022 | Jutan | G06T 15/50 |
| 2023/0046002 | A1* | 2/2023 | Soon-Shiong | G06F 9/546 |
| 2023/0154395 | A1* | 5/2023 | Mcnelley | G06T 19/006 |
| | | | | 345/76 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| EP | 3333672 A1 | 6/2018 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Wagner, Kurt, "Here's what it's like to be scanned into an NBA video game", recode.com, Sep. 16, 2016 (Year: 2016).

* cited by examiner

SYSTEM AND METHOD FOR USING ROOM-SCALE VIRTUAL SETS TO DESIGN VIDEO GAMES

CROSS-REFERENCE

The present application relies on U.S. Patent Provisional Application No. 63/265,749, titled "System and Method for Using Room-Scale Virtual Sets to Design Video Games" and filed on Dec. 20, 2021, for priority, which is herein incorporated by reference in its entirety.

FIELD

The present specification relates generally to a system and method for using room-scale virtual production sets for designing video games. More particularly the present specification relates to the use of light emitting diode (LED) walls as it relates to motion capture technology for designing and capturing video game content from multiple perspectives.

BACKGROUND

Motion capture ("mocap") is the process of recording the movement of real objects, such as a human actor, in order to create source data that is used to confirm or map the movement onto a computer graphics animation character or digital avatar of the object within a virtual landscape. A typical motion capture system uses one or more digital cameras to record the movement of the actor while illuminating a number of markers attached at a number of locations on a suit that the actor wears. A digital representation or rendering of the actor in motion is thereafter generated by analyzing the coordinates of the markers in the captured images and mapping them onto a corresponding computer graphics animation character.

Mocap offers advantages over traditional computer animation of a 3D model such as: a) enabling a preview of the spatial representation of the actor's movements in real-time or near real-time and/or b) allowing computer graphics (CG) animation characters to display more realistic and natural movement characteristics.

Filming an actor by using motion capture technique usually involves shooting scenes with the actor in front of a solid color screen, which is usually green in color. The filmed scene may be then dropped onto a required background by digitally removing or "keying out" the solid color. Removing the colored background is also referred to as "chroma keying. When traveling to location for a film is not possible, producers typically rely on chroma-key compositing to create backgrounds, which typically involves layering two images or video streams together based on color hues. A key color or color range is made transparent, and then it is replaced with content from other film or digital material.

Chroma key compositing is now a well-established technique in the film industry, but there still exists some challenges that come with it. In particular, colored light often reflects off the solid-colored screen and "spills" onto the subject, requiring removal during post-production. The color of the screen also generally cannot be used anywhere else in the shot, which places some limits on set and costume designers. And because of the limitations in rendering computer graphic content, movements of the camera are often restricted to a dolly track or a few preselected shots for which the content, such as lighting, is already prepared.

The limitations of using the traditional green screen method for motion capture are addressed by using LED walls which are typically large screens made up of light emitting diodes to display video and any other visual content, wherein the screens function similar to computer monitors. Usually, LED walls are formed from multiple panels which, in turn, are fabricated from smaller modules that have multiple multi-color LED's on them. A typical panel size may be 500 mm×500 mm or 19.7 inches×19.7 inches, and usually four such panels is used to form square meter of an LED wall. The LED's are generally surrounded by a black plastic housing. An LED wall may be a curved wall made up of high resolution digital screens where a viewer, if placed in the center and looking toward the LED screens, would be equidistant from all points of the digital screens. In such a case, the LED wall, or combined set of digital screens, cover a 270 degree field of view.

The LED wall creates a virtual set, also known as a volume', which may be used in producing video content. For example, certain television series use a volume made of a giant LED wall that comprises approximately 1,326 individual LED screens of a 2.84-mm pixel pitch, creating a 20-foot tall, 75 feet wide wall of screens defining a 270 degree view and may further optionally include a LED video ceiling extending over the top of the wall.

The use of LED walls allows for a dynamic filming environment that can automatically adjust to a camera's movement, so that the background appears natural in terms of both positioning and lighting. This ability also negates the problem of light "spill" that must be removed during post-production because all reflected light from the screen matches the desired environment. With the use of LED walls, since no key color is being reserved for removal later, there are no limits on colors for set and costume design. Hence, LED walls provide the ambient lighting for shooting a scene and also provide a high resolution background which changes as the position of the camera changes, for the part of the screen which is in the field of view of the camera.

However, unlike, in the creation of movies, when creating video games by using motion capture techniques while actors are placed before an LED wall, it is essential to present to the actors the actual gaming elements their characters are expected to react to, and capture the position of the actors relative to the LED screens (referred to as the offset) at different points. It is further essential to move the background relative to the movement of the actors (not just the camera) because, in gaming, a plurality of perspectives are required to be concurrently captured, not just a single camera view or different camera views sequentially in time. Hence, there is need for a system and methods of capturing the offset of a motion capture actor in front of an LED wall and moving the actor's background relative to the actor's movement. There is also a need to provide a game designer with the tools necessary to immerse himself or herself in a volume in order to explore, tag, annotate, or otherwise design or redesign a gaming level. Furthermore, there is a need to make the virtual landscape being depicted, or virtual characters in the virtual landscape being depicted, in a volume responsive to mocap data. Furthermore, there is a need to make a virtual production stage that may be used in an esports replay to review, discuss or explain a particular play.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a system adapted to generate video game content by modifying, in real-time, a virtual background displayed on a display wall from a perspective of a physical actor, comprising: a first set of motion capture tracking sensors coupled to the physical actor; a motion capture data acquisition system configured to capture a position and/or movement of the physical actor and generate a first set of motion capture data; a first computing engine configured to receive the first set of motion capture data and determine a first field of view of the physical actor based at least in part on the first set of motion capture data; a display wall projection system, wherein the display wall is at least 60 feet wide and 18 feet tall and defines a second field of view and wherein the second field of view is larger than the first field of view; and a second computing engine configured to generate video game content for display and to transmit the video game content to the display wall projection system, wherein the first computing engine is further adapted to transmit the first field of view to the second computing engine and wherein the second computing engine is adapted to make a first set of changes to the video game content transmitted to the display wall projection system based on the first field of view.

Optionally, the display wall projection system comprises a plurality of light emitting diode displays.

Optionally, the system, further comprises a motion capture headwear, wherein the motion capture tracking sensors are positioned on the headwear.

Optionally, the first field of view changes based on a distance of the physical actor to the display wall projection system.

Optionally, the video game content is a virtual landscape.

Optionally, the system further comprises a second set of motion capture tracking sensors coupled to a second physical actor, wherein the motion capture data acquisition system is adapted to capture a position and/or movement of the second physical actor and generate a second set of motion capture data and wherein the first computing engine is configured to receive the second set of motion capture data and determine a third field of view of the second physical actor based at least in part on the second set of motion capture data. Optionally, the first field of view and third field of view are different and are both less than the second field of view. Optionally, the first computing engine is adapted to transmit the third field of view to the second computing engine and the second computing engine is adapted to make a second set of changes the video game content transmitted to the display wall projection system based on the third field of view. Optionally, the first set of changes to the video game content transmitted to the display wall projection system based on the first field of view is presented to the physical actor within the first field of view and the second set of changes to the video game content transmitted to the display wall projection system based on the third field of view is presented to the second physical actor within the third field of view. Optionally, the first set of changes is different than the second set of changes. Optionally, the first field of view only partially overlaps the third field of view. Optionally, the system further comprises a first set of eyewear having a first polarity adapted to be worn by the physical actor and a second set of eyewear having a second polarity adapted to be worn by the second physical actor, wherein the first polarity is different from the second polarity.

The present specification also discloses a method for generating video game content by modifying, in real-time, a virtual background displayed on a display wall from a perspective of a physical actor, comprising: generating a first set of motion capture data by capturing a position and/or movement of the physical actor; determining a first field of view of the physical actor based at least in part on the first set of motion capture data; generating video game content for display by making a first set of changes to the video game content being transmitted to a display wall based on the first field of view, wherein the display wall is at least 60 feet wide and 18 feet tall and defines a second field of view and wherein the second field of view is larger than the first field of view; and presenting the physical actor with the first set of changes in the video game content corresponding to the actor's field of view, wherein said changes are unique for the physical actor.

Optionally, the motion capture data is generated by one or more motion capture tracking sensors coupled to the physical actor.

Optionally, the display wall projection system comprises a plurality of light emitting diode displays. Optionally, the motion capture tracking sensors are positioned on a headwear of the physical actor.

Optionally, the first field of view changes based on a distance of the physical actor to the display wall.

Optionally, the video game content is a virtual landscape.

Optionally, the method further comprises generating a second set of motion capture data by capturing a position and/or movement of a second physical actor; determining a third field of view of second physical actor based on the second set of motion capture data; generating video game content for display by making a second set of changes to the video game content being transmitted to the display wall based on the third field of view; and presenting the second physical actor with the second set of changes in the video game content corresponding to the third field of view. Optionally, the first field of view and third field of view are different and are both less than the second field of view. Optionally, the first set of changes to the video game content transmitted to the display wall based on the first field of view is presented to the first physical actor within the first field of view and the second set of changes to the video game content transmitted to the display wall based on the third field of view is presented to the second physical actor within the third field of view. Optionally, the first set of changes is different than the second set of changes. Optionally, the first field of view only partially overlaps the third field of view. Optionally, the first physical actor wears a first set of eyewear having a first polarity and the second physical actor wears a second set of eyewear having a second polarity, wherein the first polarity is different from the second polarity.

In some embodiments, the present specification is directed towards a method for tracking an actor's head for making corresponding changes in background imagery being displayed on an LED wall, the actor wearing a mocap suit comprising a mocap helmet, the method comprising: positioning the actor before the LED wall; displaying a background imagery on the LED wall; receiving signals at least from front and back of the mocap helmet; tracking the actor's head with respect to the background imagery by using at least the received signals to obtain tracking data; and changing the background imagery based on the tracking data enabling the background to change in accordance with movement of the actor's head.

Optionally, tracking the actor's head with respect to the background imagery further comprises using the signals received from the front and back of the helmet to determine a position of the actor with respect to the background imagery.

Optionally, the determined position relative to a line of sight is computed to determine a virtual position of the actor in a virtual world created by using the background imagery. Optionally, the determined position is used to intelligently place gaming elements at a predefined distance, position, and angle relative to the actor in the virtual world. Optionally, the determined position is used to obtain an offset of the actor's head with respect to the background imagery. Optionally, the obtained offset and the line of sight are used to enable acquisition of content at a desired resolution.

Optionally, changing the background imagery based on the tracking data further comprises calculating a position of the actor, the LED wall, and the content to be rendered in in a virtual world created by using the background imagery with respect to each other for determining a degree of skew required for the content to be rendered.

Optionally, the method further comprises capturing scenes enacted by the actor positioned before the LED wall by using a camera.

Optionally, the method further comprises using the processed signals received from the helmet, and the captured scenes for tracking the actor's head with respect to the background imagery being displayed on the LED wall.

Optionally, the mocap suit comprises one or more props comprising tactile haptic actuators positioned at one or more predefined coordinates, locations or positions on the props.

Optionally, in some embodiments, the methods of the present specification are used to design and shoot a video game comprising one or more gaming levels.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
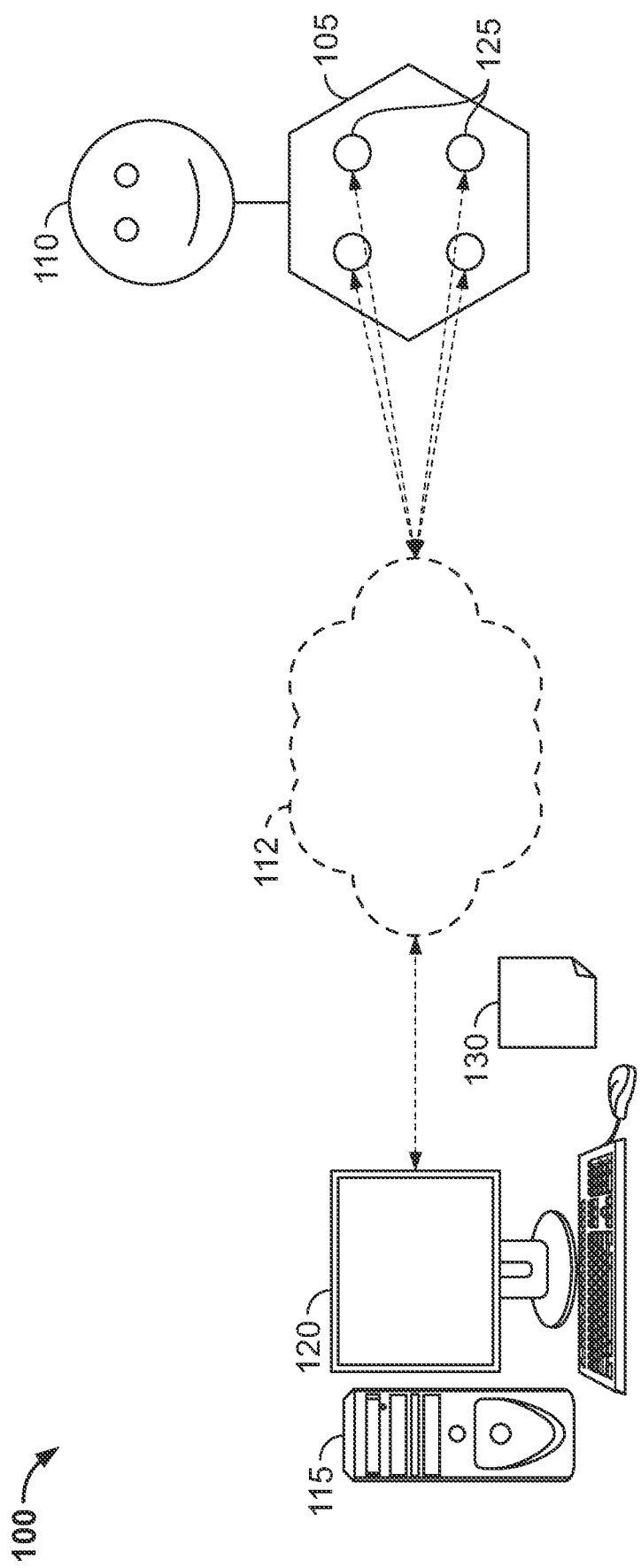
FIG. 1 is a schematic diagram of a motion capture system, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "module" used in this disclosure may refer to computer logic utilized to provide a desired functionality, service or operation by programming or controlling a general purpose processor. Stated differently, in some embodiments, a module implements a plurality of instructions or programmatic code to cause a general purpose processor to perform one or more functions. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

In various embodiments, a "computing device" includes an input/output controller, at least one communications interface and system memory. In various embodiments, the computing device includes conventional computer components such as a processor, necessary non-transient memory or storage devices such as a RAM (Random Access Memory) and disk drives, monitor or display and one or more user input devices such as a keyboard and a mouse. In embodiments, the user input devices allow a user to select objects, icons, and text that appear on the display via a command such as a click of a button on a mouse or keyboard or alternatively by touch in embodiments where the display is a touch-enabled screen. The computing device may also include software that enables wireless or wired communications over a network such as the HTTP, TCP/IP, and RTP/RTSP protocols. These elements are in communication with a central processing unit (CPU) to enable operation of the computing device. In various embodiments, the computing device may be a conventional standalone computer, a mobile phone, a tablet or a laptop. In some embodiments, the functions of the computing device may be distributed across multiple computer systems and architectures.

In some embodiments, execution of a plurality of sequences of programmatic instructions or code enables or causes the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

In various embodiments, a motion capture system of the present specification includes at least one processor capable of processing programmatic instructions, has a memory capable of storing programmatic instructions, and employs software comprised of a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

As used herein, the term actor refers to a human person, who is the subject of a motion capture system, wears clothing having markers attached at various locations to enable digital cameras to record the being's movement, and/or is expected to move as guided by the motion capture movement system of the present specification.

Motion capture uses motion-tracking cameras to capture the movement of an actor or object wearing motion tracking markers. The data is communicated to a computer equipped with motion capture software. The software creates a virtual skeleton by using the motion capture data, that moves with the actor in real-time. As the actor performs, the director and the production team may watch a preliminary animated version of the actor's performance. Once the desired performance has been achieved, the character is animated over the skeleton in post-production or real-time.

FIG. 1 shows a motion capture (hereinafter referred to as "mocap") system 100 comprising at least one prop 105 worn, held and/or carried by an actor 110 and that includes one or more tactile haptic actuators 125 positioned at one or more predefined coordinates, locations or positions on the at least one prop 105. The one or more tactile haptic actuators 125 are in data communication, via a wired or wireless network 112, with a computing device 115 coupled with a display 120, in accordance with some embodiments.

In various embodiments, the at least one prop 105 comprises items that may be worn such as, but not limited to, body suits, jackets, vests, armors, helmets, caps, shoes, gloves, pads (elbow, knee and hand) and face masks as well as items that may be held and/or carried such as, but not limited to, shields, flags and weapons such as guns, knives, and swords, for example.

In various embodiments, the one or more actuators 125 are capable of generating kinesthetic feedback or stimuli to the actor 110 and may be of different types such as, for example, piezoresistive, piezoelectric, capacitive and elasto-resistive. In some embodiments, the one or more actuators 125 generate and deliver feedback or stimuli, to the actor 110, in the form of vibrations. In some embodiments, the one or more actuators 125 are eccentric rotating mass (ERM) actuators, consisting of an unbalanced weight attached to a motor shaft. As the shaft rotates, the spinning of this irregular mass causes the actuator and the attached device to shake. In some embodiments, the one or more actuators 125 accomplish their vibrations with a linear resonant actuator (LRA), which moves a mass in a reciprocal manner by means of a magnetic voice coil, similar to how AC electrical signals are translated into motion in the cone of a loudspeaker. Persons of ordinary skill in the art would appreciate that LRAs are capable of quicker response times than ERMs, and thus can transmit more accurate haptic feedback or stimuli.

In embodiments, a wireless module/transceiver module or wireless functionalities are embedded within each of the actuators 125. The wireless module may be, in one embodiment, a Wi-Fi microprocessor that enables actuators 125 to execute instructions provided by the microprocessor or computing device 115. In embodiments, the wireless module is in data communication with the actuators 125. In some embodiments, the wireless module is a microcontroller that has a small footprint and has low power requirements. In some embodiments, the computing device 115 is remotely located that communicates wirelessly with the wireless module to operate the actuators 125. In embodiments, the computing device/processor 115 communicates commands or instructions that are executable by the actuators 125. In various embodiments, the processor 115 may be a personal computer, a laptop, a portable computing device, or any other electronic device that enables creating instructions that are executable by the actuators 125 and can communicate those instructions wirelessly to wireless module. In embodiments, the wireless module is a Radio Frequency (RF) module, a Wi-Fi module, a Bluetooth module, or any other module capable of facilitating wireless communication between the computing device 115 and the actuators 125. In some embodiments, each of the one or more actuators 125 further comprises an RFID (Radio Frequency Identification) tag that uniquely identifies each actuator.

In embodiments, the one or more actuators 125 are positioned at one or more predefined and desired coordinates, locations or positions on the at least one prop 105.

These one or more coordinates, locations or positions are then mapped to unique identifications of the positions of the one or more actuators 125. In embodiments, the position of an actuator on a prop is determined by surveying, calibrating, measuring or acquiring a digital representation for mapping the accurate positions on the prop. Thus, the desired position of the actuator is coded on the prop and the actuator is placed on that prop visually or by leveraging a tracking object (such as a mocap marker) or measuring the position relative to the physical characteristics of the prop.

Figure 2:
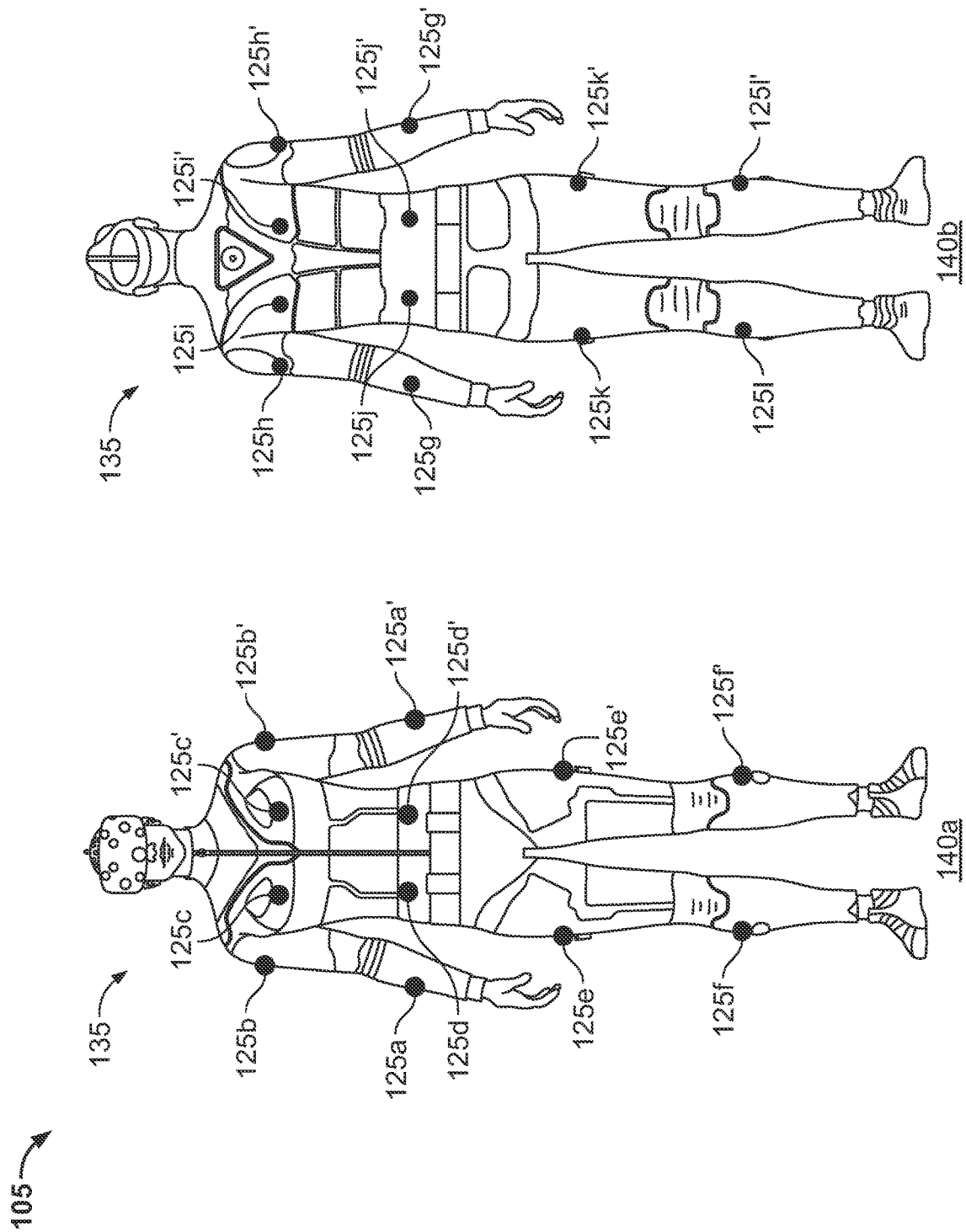
FIG. 2 is a prop in the form of a motion capture body suit equipped with one or more actuators, in accordance with some embodiments of the present specification.

As a non-limiting illustration, FIG. 2 shows a prop 105 configured as a mocap body suit 135 being worn by the actor 110, in accordance with some embodiments of the present specification. The front view 140a shows a plurality of actuators 125a-f positioned at predefined coordinates, locations or positions on a front-facing side of the suit 135. Similarly, the rear view 140b also shows a plurality of actuators 125g-l' positioned at predefined coordinates, locations or positions on a rear-facing side of the suit 135.

As shown in the front view 140a, in an exemplary embodiment, a first actuator 125a is positioned on the left lower arm, a second actuator 125b is positioned on the left upper arm, a third actuator 125c is positioned on the left chest, a fourth actuator 125d is positioned on the left abdomen, a fifth actuator 125e is positioned on the left thigh and a sixth actuator 125f is positioned on the left crus. Similarly, a seventh actuator 125a' is positioned on the right lower arm, an eighth actuator 125b' is positioned on the right upper arm, a ninth actuator 125c' is positioned on the right chest, a tenth actuator 125d' is positioned on the right abdomen, an eleventh actuator 125e' is positioned on the right thigh and a twelfth actuator 125f' is positioned on the right crus.

As shown in the rear view 140b, in an exemplary embodiment, a thirteenth actuator 125g is positioned on the left lower arm, a fourteenth actuator 125h is positioned on the left upper arm, a fifteenth actuator 125i is positioned on the left upper-back, a sixteenth actuator 125j is positioned on the left lower-back, a seventeenth actuator 125k is positioned on the left thigh and an eighteenth actuator 125l is positioned on the left crus. Similarly, a nineteenth actuator 125g' is positioned on the right lower arm, a twentieth actuator 125h' is positioned on the right upper arm, a twenty-first actuator 125i' is positioned on the right upper-back, a twenty-second actuator 125j' is positioned on the right lower-back, a twenty-third actuator 125k' is positioned on the right thigh and a twenty-fourth actuator 125l' is positioned on the right crus.

Referring back to FIG. 1, it should be appreciated that the number of actuators 125 and their positioning on a prop 105 (such as the suit 135 of FIG. 2) would vary in various embodiments depending at least upon a type of prop 105 being used along with the number and nature, characteristic or type of the one or more predefined events occurring in accordance with a script being enacted by the actor 110. Thus, the number and positioning of the actuators 125 are determined based on a predefined positioning protocol or scheme suited or relevant to the scripted events and actions of a scene. In embodiments, the one or more predefined events are those that must elicit or evoke a relevant reaction, outcome or response from the actor 110.

In some embodiments, the nature, characteristic or type of the at least one event is such that the at least one event results in a physical contact with the body of the actor 110 during performance. For example, the actor 110 getting hit by one or more bullets or punches on his body. In some embodiments, the nature, characteristic or type of the at least one event is such that the at least one event results in a force or effect to be felt by the actor 110 during performance without any physical contact. For example, the actor 110 may feel the force of a shockwave resulting from one or more explosions. In some embodiments, the nature, characteristic or type of the at least one event is such that the at least one event has a localized or targeted physical contact on the body of the actor 110. For example, the actor 110 may receive a bullet on his right upper arm region. In some embodiments, the nature, characteristic or type of the at least one event is such that the at least one event has a distributed physical contact or non-contact influence on the actor 110. For example, the actor 110 may get hit by a plurality of punches (contact influence) all over his trunk or the actor 110 may experience strong wind (non-contact influence) on his back from an approaching storm or at least one explosion. Accordingly, an event may be defined as any occurrence, such as an explosion, gunfire, physical altercation, collision, among other actions, in a motion capture script that would require, in response, a physical response from the motion capture actor.

In accordance with aspects of the present specification, the one or more actuators 125 are programmed to generate and deliver tactile haptic feedback or stimuli to the actor 110. In some embodiments, the tactile or haptic feedback may be in the form of a vibration produced by electronics (motor or signal) or sound. In some other embodiments, feedback or stimuli can be provided via a physical actuator, a fluid/pressure differential, or heat/electric shock. In some embodiments, the tactile haptic feedback or stimuli is delivered in sync, tandem or in-time with occurrence of one or more predefined events while the actor 110 is performing in accordance with a script of an act or play. In embodiments, feedback or stimuli may be programmed to be associated with or correlate to a predefined event. For example, feedback or stimuli may represent, but is not limited to, a type of motion, an intensity of action or motion, a direction, a length of time, or a minimum or maximum area. Such feedback or stimuli, provided to the actor 110 during his mocap performances, enable the actor 110 to stay in sync with the occurrence of the one or more predefined events in the script and thereby deliver more realistic performances.

In accordance with aspects of the present specification, the computing device 115 stores a scripting module 130 that, when executed, implements a plurality of programmatic instructions or code to generate at least one front-end GUI (Graphical User Interface) to enable an administrator to control the mocap script's narrative with respect to the actor.

In various embodiments, the present specification provides methods of capturing the offset of a motion capture actor in front of a display wall projection system, such as but not limited to, an LED wall, whereby the actor's background is moved relative to the actor's movement. In an embodiment, the present specification provides a method for providing background imagery for different gaming levels in which an actor is required to perform, controlling the background imagery, such as sand dunes, forests, a village, etc., by tracking the actor's head so that as the actor moves through different gaming levels, the background imagery changes accordingly.

In embodiments, the system and method of the present specification provides for presentation of gaming elements that the characters performed by mocap actors are expected to react to during a scene being shot. Further, in embodiments, the position of predetermined points on each actor's mocap gear is captured relative to each LED screen as the background imagery being displayed on said LED screens is moved relative to the movement of the actor (not just the camera).

Figure 3A:
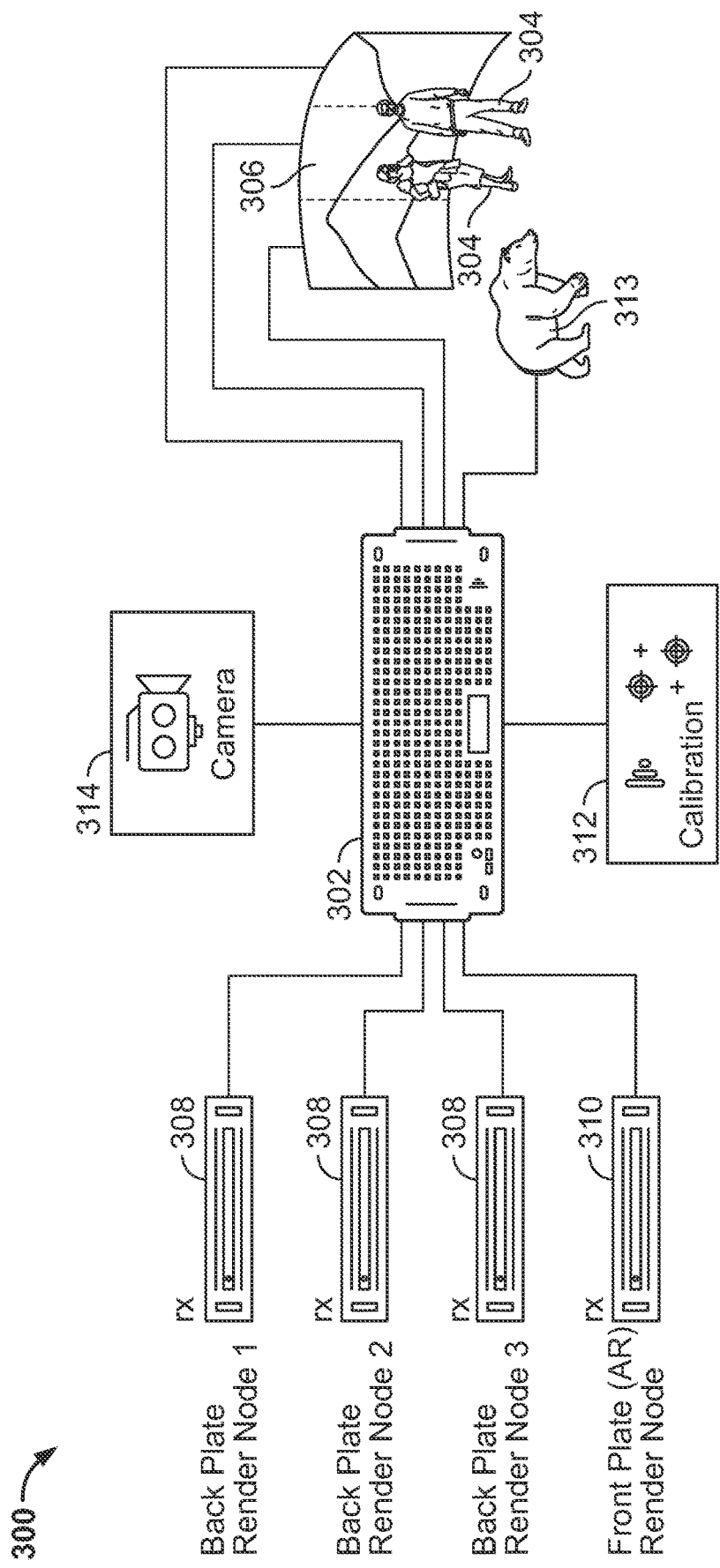
FIG. 3A illustrates a block diagram of a system for tracking an actor's head for making corresponding changes in the actor's background imagery, in accordance with an embodiment of the present specification.
Figure 3B:
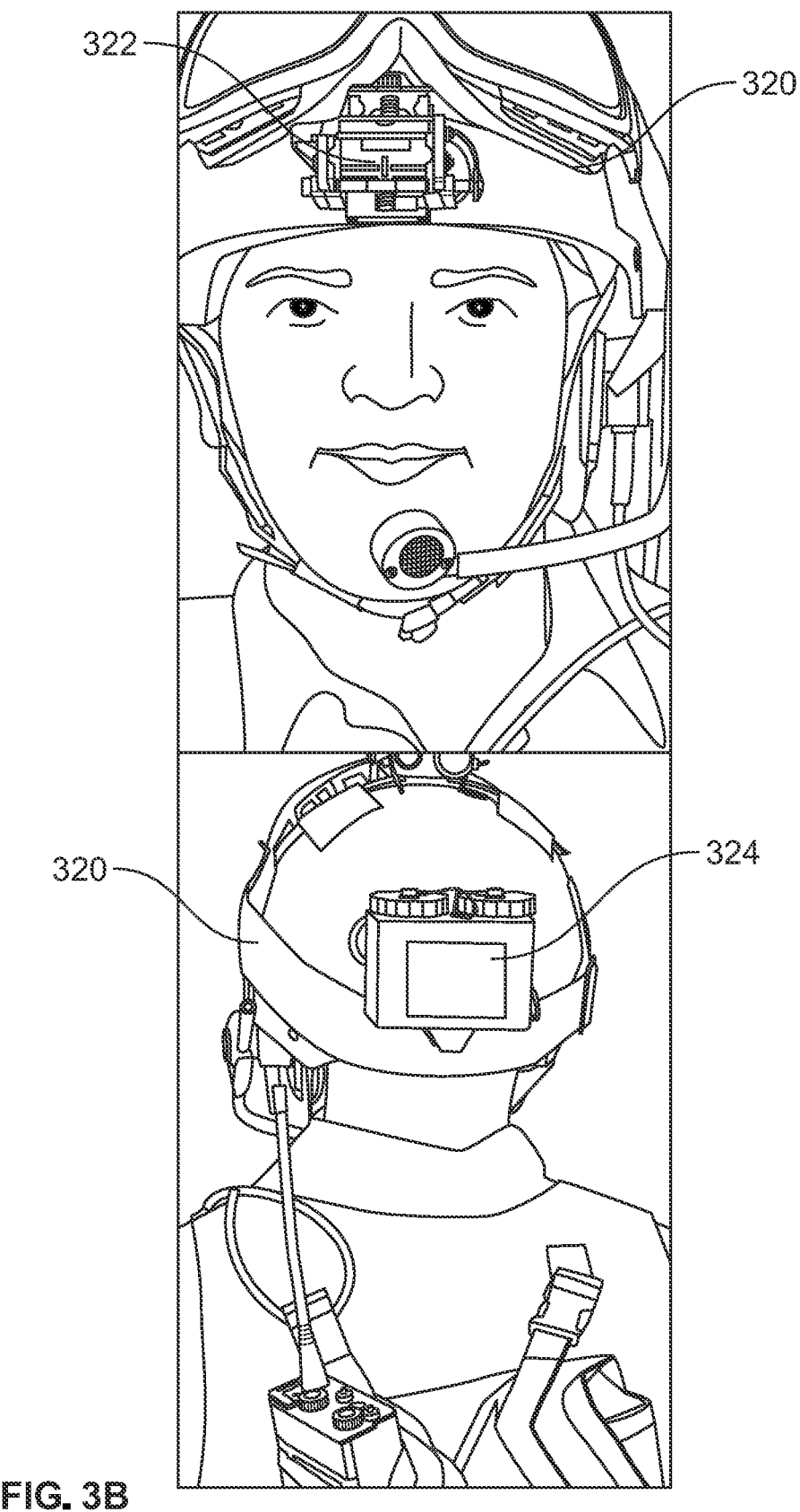
FIG. 3B illustrates a front and back view of an actor wearing a mocap helmet.

FIG. 3A is a block diagram illustrating a system for tracking an actor's body for generating corresponding changes in the actor's background imagery, in accordance with an embodiment of the present specification. System 300 includes a computing engine 302 for processing signals received from mocap body suits and props worn by or carried by mocap actors 304 performing before an LED wall or volume 306, whereby the LED wall or volume 306 is coupled to and in communication with the computing engine 302. FIG. 3B illustrates a front and back view of an actor wearing a military helmet with gear mounts. Helmet 320 is provided with a front signal transmitter plate 322 and a back signal transmitter plate 324 coupled with the front plate render node 310 and the back plate render nodes 308, respectively. In embodiments, in order to track head movements of an actor, any object worn by the actor such as, but not limited to, a helmet, a cap and/or glasses coupled with any type of markers, such as, but not limited to optical markers, fiducials, accelerometers, or IMUs may be used.

The engine 302 receives signals from front signal transmitter plate 322 and a back signal transmitter plate 324 of helmet 320 worn by the actors 304 via three back plate render nodes 308 and a front plate render node 310. In embodiments, each of the three back plate render nodes 308 provide signals corresponding to a predefined section of the LED wall based on an output resolution of a graphics processing unit (GPU) of the system and a pixel density of the LED wall. For example, if the pixel resolution of the LED wall is 8K×4K, four GPU outputs having a pixel resolution of 4K×2K would be required in order to obtain a full wall resolution. In embodiments, the front plate render node 310 provides signals corresponding to an alpha object that overrides the video image of the mocap actors 304 simulating an instance where a computer generated (CG) object is placed in front of the actors 304 that is rendered as a foreground object. In some embodiments, multiple render nodes may be multiplexed for out-of-phase graphics interleaving with the LED wall representing different perspectives at the same time.

In embodiments, the props worn, held and/or carried by the actors 304 comprise one or more tactile haptic actuators positioned at one or more predefined coordinates, locations or positions on the props. The one or more tactile haptic actuators are in data communication, via a wired or wireless network, with the computing engine 302. In various embodiments, the props comprise items that may be worn such as, but not limited to, helmets, body suits, jackets, vests, armors, helmets, caps, shoes, gloves, pads (elbow, knee and hand) and face masks as well as items that may be held and/or carried such as, but not limited to, shields, flags and weapons such as guns, knives, and swords, for example.

Referring to FIG. 3A, in an embodiment, the signals received from the front signal transmitter plate 322 and a back signal transmitter plate 324 of helmet 320 worn by mocap actor 304 are used to determine a position of the actor 304 with respect to the background which may be referred to as an "offset". An offset relative to a line of sight is computed to determine a position of the actor 304 in a virtual world created by using the background imagery displayed via the LED wall 306. The computed offset enables obtaining a desired focus while the line of sight computation is required for obtaining desired content. The computed offset and the line of sight are used to enable acquisition of content at a desired resolution. The computing engine 302 is, in embodiments, coupled with a calibration unit 312 and a camera 314 for capturing scenes enacted by the actors 304 before the LED wall 306.

In an embodiment, the computed offset is used by a computing engine to intelligently place gaming elements 313 (such as, but not limited to, a tanker or an explosion) at a desired distance, position, and angle relative to the actor. Offset data positions an animation post production in order to align actor to scenery. It should be appreciated, therefore, that computing engine 302 changes, moves, aligns, or otherwise modifies the background imagery, displayed on the LED wall, in relation to the mocap data being received and/or as a function of the offset value.

It should further be appreciated that this modification may be optionally circumscribed to a field of view perspective of a singular actor and therefore effectuated across a field of view of the LED wall that is less than the entire LED wall size. For example, if the mocap actor is six feet tall and is offset from a point on the LED wall by 2 feet, the area of the LED wall that may change is circumscribed to a function of the mocap actor's height and distance from the wall, such as an area equivalent to 7 feet high by 6 feet wide. Such an area may increase if the offset is greater and/or if the mocap actor is taller. Such an area may decrease if the offset is smaller and/or if the mocap actor is shorter. This enables the background scenery displayed on the LED wall to modify based on multiple actors concurrently, each of which may have an independent or non-overlapping associated field of view. Therefore, while a 7 foot high by 6 foot wide area modifies for the first mocap actor, concurrently a 6 foot high, 8 foot wide area modifies for a second mocap actor who is slightly shorter but positioned slighter further away from the LED wall relative to the first mocap actor. Described below is a polarity differential approach to addressing situations where the areas of background imagery may overlap between actors.

Figure 4:
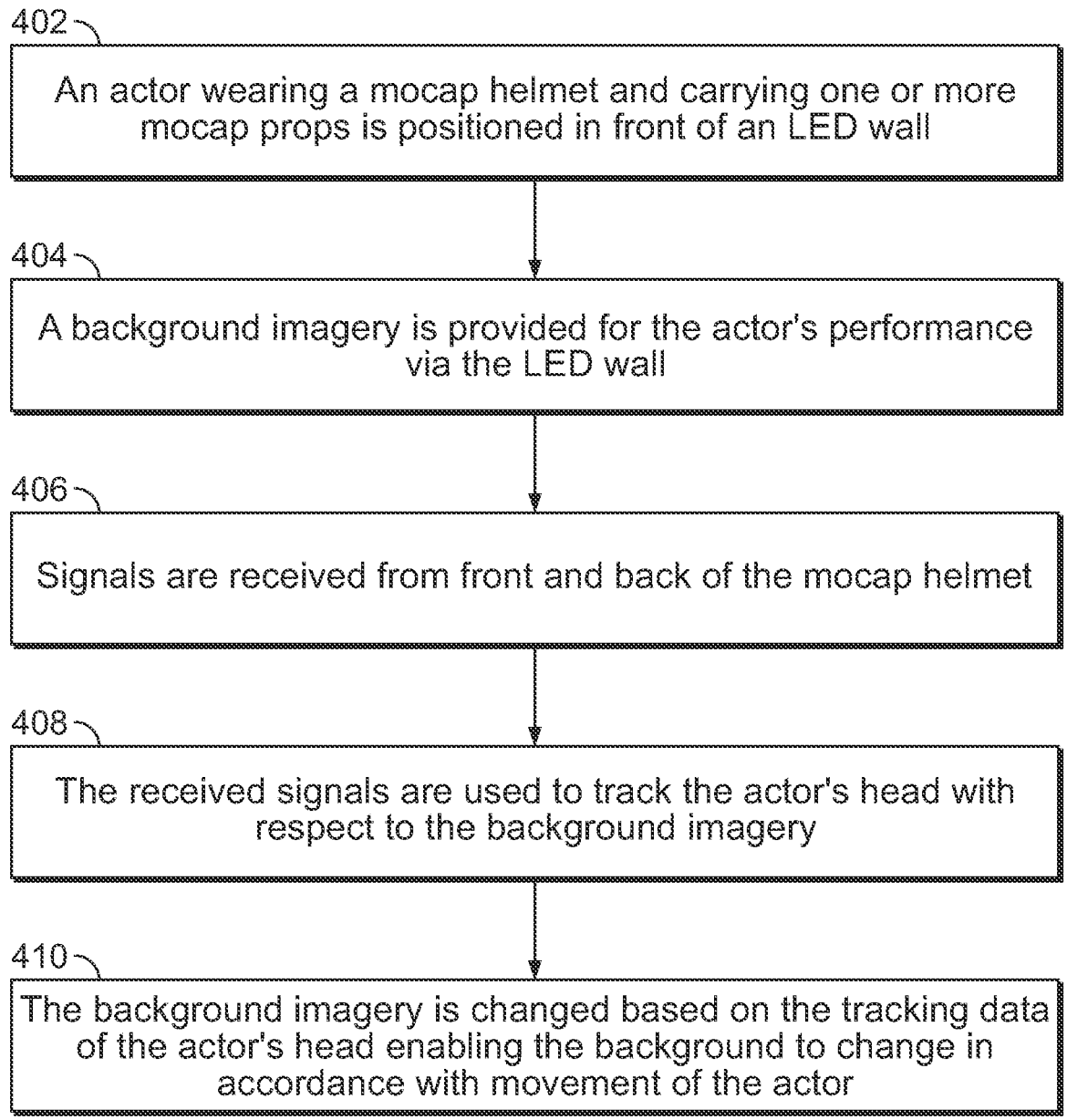
FIG. 4 is a flowchart illustrating the steps of tracking an actor's head for making corresponding changes in the actor's background imagery, in accordance with an embodiment of the present specification.

FIG. 4 is a flowchart illustrating the steps of tracking an actor's body for generating corresponding changes in the actor's background imagery, in accordance with an embodiment of the present specification. At step 402, an actor wearing a mocap helmet and carrying one or more mocap props is positioned in front of an LED wall. At step 404, at least one piece of background imagery is provided, via the LED wall, to animate or contextualize the actor's performance. At step 406, signals are received the front signal transmitter(s) and a back signal transmitter(s) of the mocap helmet, or alternatively on any portion of a garment being worn by the actor. At step 408 the signals, received by the calibration unit, are used to track the actor's body with respect to the background imagery. At step 410 the background imagery is changed based on the tracking data of the actor's head enabling the background to change in accordance with movement of the actor. In embodiments, any positional data such as, but not limited to, optical, laser, or fiducial obtained by tracking the actor's body with respect to the background imagery, is sent to the game engine as 6-degree of freedom data comprising at least translation and rotational data. In an embodiment, the computational engine aligns said data with the gaming level or the CG environment. In various embodiments, the LED screen is a calibrated object (modeled or scanned and entered into the game engine as a projection screen) and as the tracking point representing the mocap actor's head moves in the game engine, the view from that point is rendered through the projection screen and transmitted as the render sections from each GPU through the computing unit to predefined LED wall sections.

In embodiments, tracking the actor's mocap helmet/props provides information regarding the actor's position with respect to the background imagery and enables computation of changes to be made to said imagery relative to movement of the actor. In embodiments, information regarding the actor's position is transmitted to the computational engine as six degrees of positional data at a plurality of data rates which may range from 30 Hz to 120 Hz. The transmitted data corresponds to a world alignment which comprises correlating relative coordinate systems of real-world head tracking volume to virtual space in a game engine environment. In some embodiments, the positional data may be scaled or processed to provide effects such as, but not limited to locking out one or more parameters of the data, by the computational engine.

In embodiments, the background imagery is changed based on a position of the actor relative to the items in the background. For example, if in a scene being shot, a tank is shown placed at a distance from an actor, the tank may not be required to move until the actor reaches within a predefined distance from said tank, after which the tank is required to increase in size corresponding to decrease in distance from the actor. Further, not all elements (props) placed in the scene being shot change in scale equally. The change in display size in the scene for elements placed in the scene is relative to the perspective field of view of a viewer. In embodiments, step 410 of FIG. 4 further comprises calculating: a) a position of the actor; b) a position of the screen (LED wall); and c) a position of the content to be rendered in the scene being shot with respect and reference to each other in order to determine a degree (magnitude) of skew required for the content to be rendered.

In embodiments, the computing engine comprises a computer generated (CG) wall which is identical in geometry to the LED wall. Positions within the CG wall may be moved and manipulated by the computing engine. The CG wall is placed in a desired position in a gaming level enabling a (required) camera or acting coverage within the level. The CG wall comprises a CG mocap tracking volume which represents the physical space on the LED wall within which a mocap actor can be tracked. This is typically fixed to the CG wall in the computing engine as it represents the physical relationship of the actor or camera to the LED wall. The content displayed on the LED wall may be varied such that it is moves differently from the actual object corresponding to the content. For example, a car displayed on the LED screen may be made to spin while a corresponding actual car is standing still. The displayed content may also be scaled with respect to a corresponding real counterpart. For example, a level designer performing a walk-through of the content may move at the rate of the player character which is much faster than real human motion, such that one physical step of the designer represent ten steps of the player character on the LED screen. As the designer gets closer to the LED wall, the relationship between the LED wall and the gaming level is reset. For example, the designer may need to slide along as if starting in the next section and physically move back to provide more physical travel space within the new level position.

Conventionally, the LED wall displays scenes viewed through a camera perspective, i.e. the camera's perspective is rendered on the LED wall. In an embodiment, where there is more than one actor in a scene being shot by using a camera before an LED wall, each actor is required to wear glasses, wherein the glasses being worn by different actors are designed at different polarities so that the content viewed by each of the actors is phased differently, where a first polarity is associated with a first actor and therefore, the field of view of the first actor and where a second polarity, different from the first polarity, is associated with a second actor and therefore, the field of view of the second actor is different from the first field of view. This enables displaying content on the LED wall in accordance with each actor's perspective, particularly where their fields of view may overlap, as well as projecting the camera's perspective by interlacing the content at a high predefined frequency.

Figure 5:
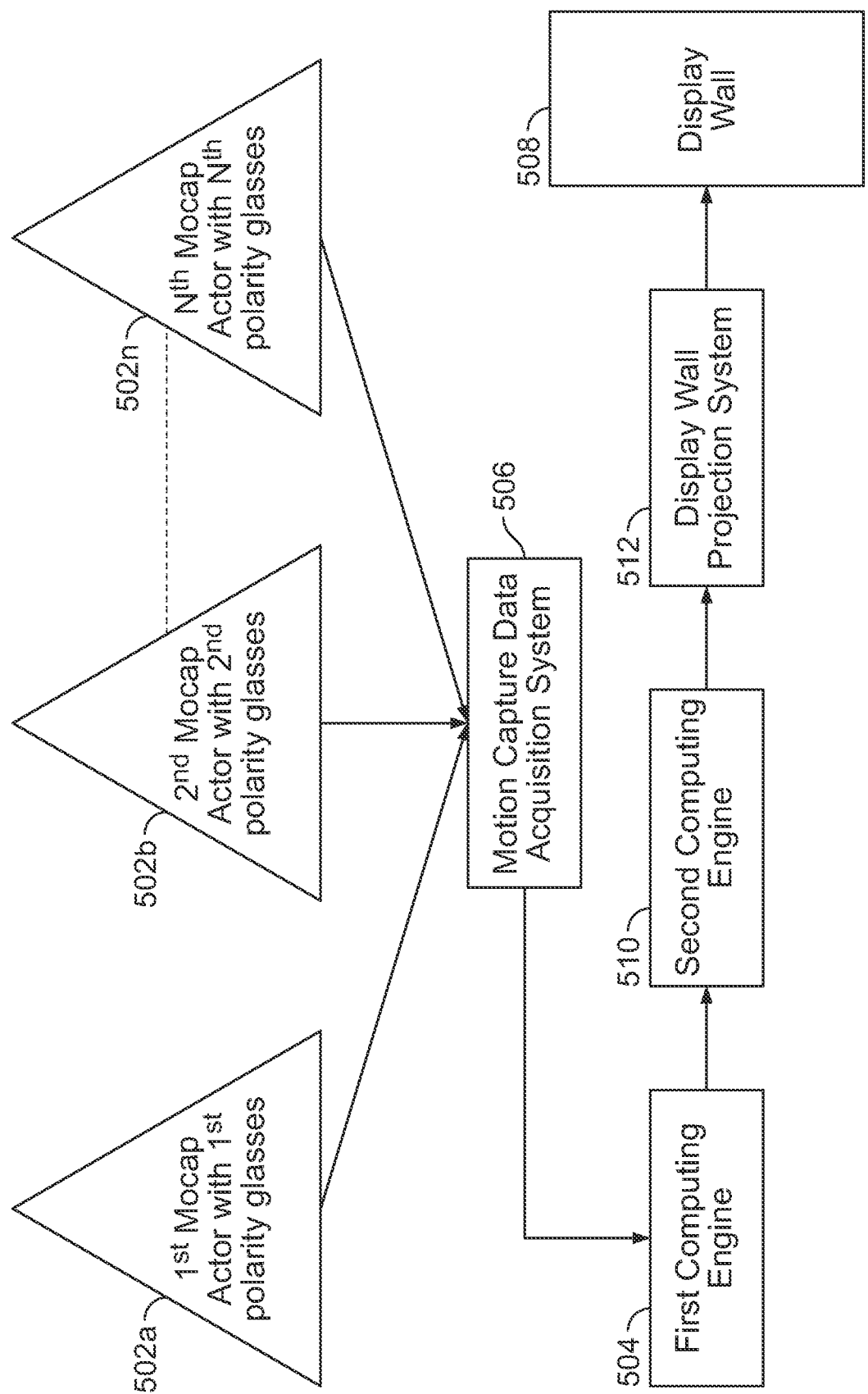
FIG. 5 is a block diagram illustrating a motion capture system with more than one actor, in accordance with an embodiment of the present specification.

FIG. 5 is a block diagram illustrating a motion capture system with more than one actor, in accordance with an embodiment of the present specification. Each actor 502*a*, 502*b* . . . 502*n* is provided with at least one prop worn, held, and/or carried by the actor whereby the prop includes one or more tactile haptic actuators arranged at one or more predefined coordinates, locations, or positions. Further, each actor 502*a*, 502*b* . . . 502*n* wears glasses having a polarity different from each of the glasses worn by any of the other actors. In an embodiment, a first computing engine 504 is configured to receive a set of motion capture data from a motion capture data acquisition system 506 configured to capture a position and/or movement of each physical actor 502*a*, 502*b* . . . 502*n*. The motion capture data is used to determine a field of view of each physical actor 502*a*, 502*b* . . . 502*n*, respectively, by the first computing engine 504. The field of view of each actor 502*a*, 502*b* . . . 502*n* changes based on a distance that the physical actor is located from a display wall 508, which in some embodiments is a LED wall. In an embodiment, the LED wall 508 is at least 60 feet wide and 18 feet tall and defines a second field of view which is larger than the field of view of any of the physical actors 502*a*, 502*b* . . . 502*n*. In another embodiment, the LED wall 508 is between 20 and 100 feet wide (and every whole number increment therein) and 6 to 48 feet tall (and every whole number increment therein) and defines a second field of view which is larger than the field of view of any of the physical actors 502*a*, 502*b* . . . 502*n*. In various embodiments, the LED wall may be of any size, ranging from the size of a standard computer monitor to up to 300 feet wide. In embodiments, a field of view (FOV) may extend to the size of the entire LED wall. The FOV of an LED wall is matched with corresponding camera lens focuses; wherein multiplexing solves the problem of overlapping camera frustums. When a scene is being shot with two cameras having either different focal lengths or placed at different positions, but which are pointing at the same portion of an LED wall, the two cameras are required to be out of phase in addition to seeing their own synced content, which is limited by the content frame rate ranging from 24 Hz to 240 Hz times the number of viewers. In embodiments, the refresh rates of LED panels in the LED wall are approximately 7680 Hz.

In an embodiment, a second computing engine 510 is configured to generate video game content for the display, and to transmit the generated video game content, which comprises a virtual landscape, to a display projection system 512 which receives the generated video game content. The display projection system 512 projects the received generated video game content onto the LED wall 508. In an embodiment, the first computing engine 504 transmits the fields of view of each of the physical actors 502*a*, 502*b* . . . 502*n* to the second computing engine 510 for making changes to the video game content transmitted to the display wall projection system 512 based on each of the transmitted fields of view. In embodiments, the fields of view of the actors 502*a*, 502*b* . . . 502*n* may partially overlap. Each actor 502*a*, 502*b* . . . 502*n* is presented with changes in the video game content corresponding to the respective actor's field of view, wherein said changes are unique for each actor. In an embodiment, the first computing engine may be the same as the second computing engine.

Figure 6:
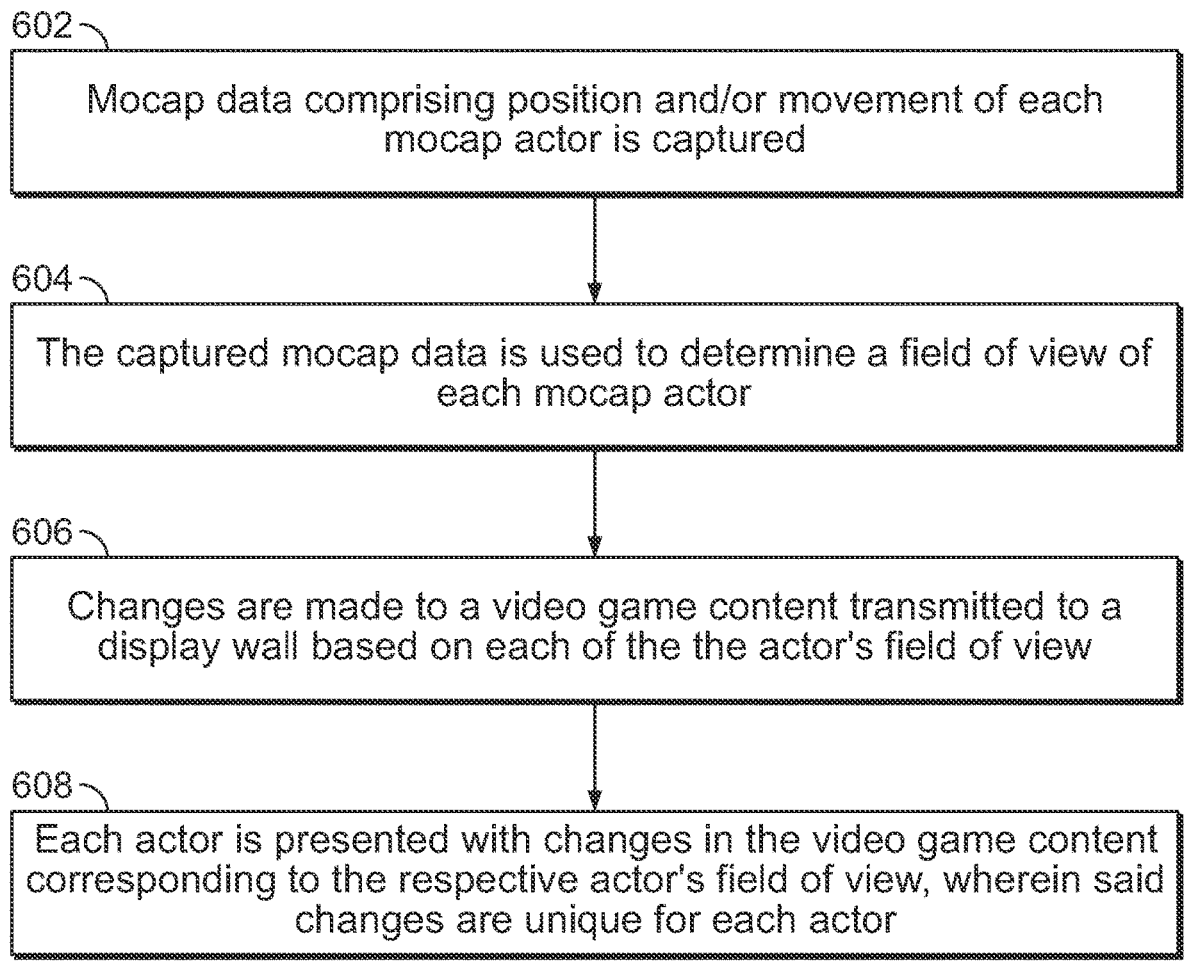
FIG. 6 is a flowchart illustrating steps of a method for generating video game content by modifying, in real-time, a virtual background displayed on a display wall from a perspective of a physical actor, in accordance with an embodiment of the present specification.

FIG. 6 is a flowchart illustrating steps of a method for generating video game content by modifying, in real-time, a virtual background displayed on a display wall from a perspective of a physical actor, in accordance with an embodiment of the present specification. At step 602, mocap data comprising at least one position and/or movement of each mocap actor is captured. In embodiments, each actor is fitted with and coupled to at least one prop worn, held, and/or carried by the actor and that includes one or more tactile haptic actuators arranged at one or more predefined coordinates, locations, or positions. Further, each actor wears glasses having a polarity different from any of the glasses worn by any of the other actors. At step 604, the captured mocap data is used to determine a field of view of each mocap actor. In embodiments, the field of view of each actor changes based on a distance of the physical actor from a display wall, which in some embodiments is a LED wall. In embodiments, the LED wall is at least X feet wide and Y feet tall and defines a second field of view. In embodiments, the second field of view (the LED wall) is larger than the first fields of view (where a field of view represents each of the physical mocap actors). In embodiments, the fields of view of the actors 502a, 502b . . . 502n may partially overlap. At step 606 changes are made to video game content transmitted to a display wall based on each actor's field of view. In an embodiment, a computing engine is configured to generate video game content for the display, and to transmit the video game content, which comprises a virtual landscape, to a display projection system, which in turn, projects the received content onto the LED wall. At step 608, each actor is presented with changes in the video game content corresponding to the respective actor's field of view, wherein said changes are unique for each actor.

In an embodiment, the present specification provides a design tool to a video game designer for designing different levels of a video game. The design tool enables a game designer to interact with the game level by providing a virtual production stage so that the designer can be physically immersed in the design and move around within the level. The design tool may be used for designing different video game levels as well as for directing a continuous game play mode within the level. In various embodiments, the design tool provides the designer with a character-level design tool that allows designers to use real actors and costumes/gear to be placed in a virtual video game level. In embodiments, this may be achieved by allowing a plurality of actors to walk through the same gaming environment/level and see, from different perspectives, various gaming elements. The different perspectives may then be captured and used for designing the level. In an embodiment, each of the plurality of actors is provided with a controller that allows said actors to perform at least one of the following functions: a) drop a gaming element such as an obstruction, which may include but is not limited to a tree or a wall, into a predefined place within the gaming level or b) challenge/object to/comment on a gaming element placed by a different actor, with the ability to associate a note with the gaming element explaining how the gaming element prevents entry of one or more actors to particular places in the gaming level. In embodiments, the controller may be one or more of: a wired/wireless device, a passive prop, a gesture command, a device/prop having an active Bluetooth connection and mapped button functions, or an IR/Bluetooth/sensor based tracking device connected to any object or function in the game engine. For example, an infrared tracker moving a CG light source in the computational engine may be used to simulate an actor carrying a flashlight.

It should be appreciated that, operationally, a virtual landscape may be presented on a LED wall. A game designer may wear or carry a motion capture enabled garment or device. As the game designer moves through the virtual landscape, the virtual landscape moves and changes, as described above, in relation to the perspective of the game designer. The game designer has the option of moving a controller, preferably equipped with a motion capture tracker as well such that an offset can be determined, directing it at location on the LED wall, and providing an input into the controller to define whether an object at that location should be removed or moved, to define whether a new object should be positioned at that location, or to define whether a note or message for other designers should be incorporated.

Figure 7:
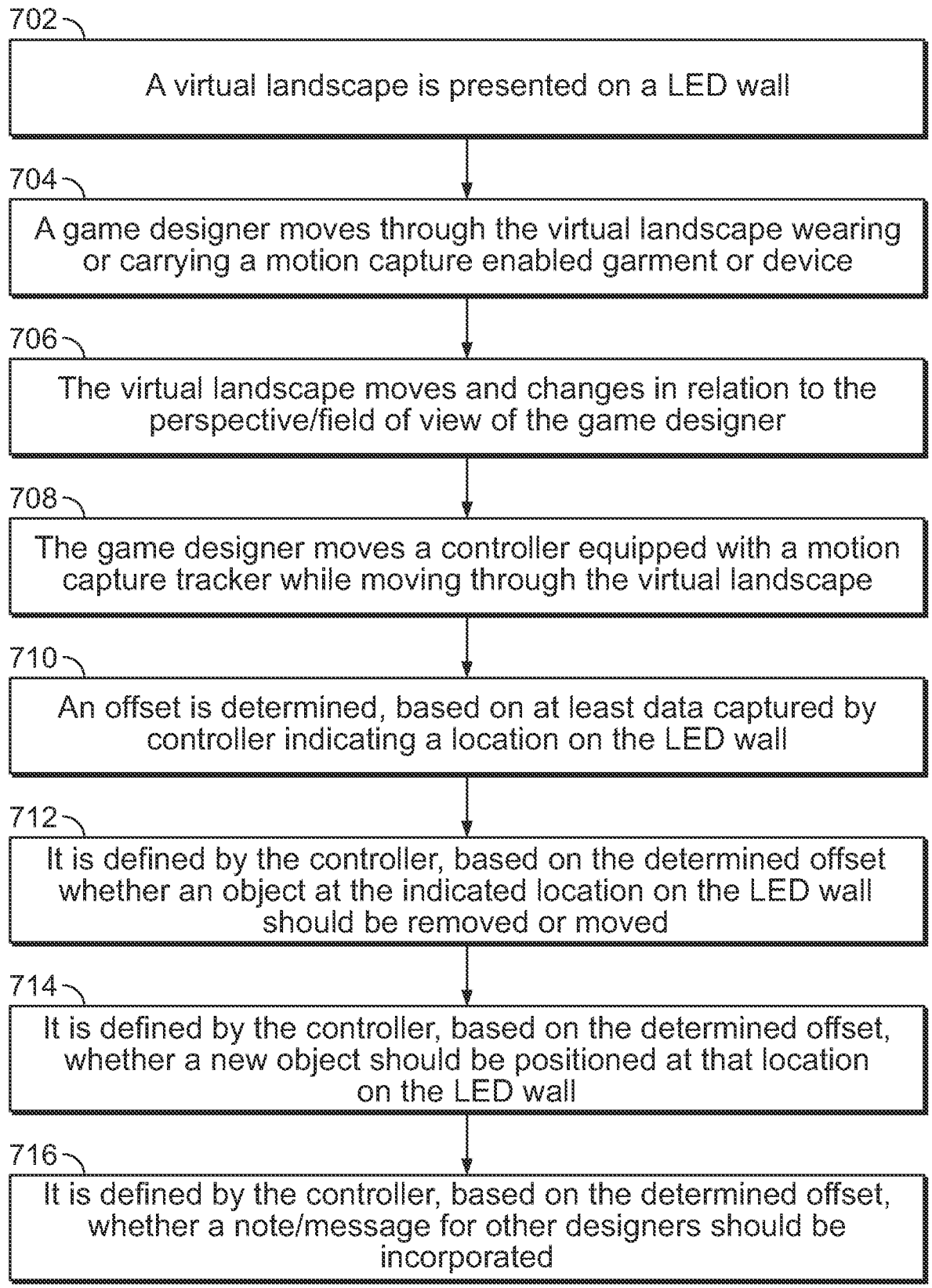
FIG. 7 is a flowchart illustrating steps of a method for designing different levels of a video game, in accordance with an embodiment of the present specification.

FIG. 7 is a flowchart illustrating a method for designing different levels of a video game, in accordance with an embodiment of the present specification. At step 702, a virtual landscape is presented on a LED wall. At step 704, a game designer moves through the virtual landscape wearing or carrying a motion capture enabled garment or device. At step 706, the virtual landscape moves and changes in relation to the perspective/field of view of the game designer, as described above. At step 708, the game designer moves a controller equipped with a motion capture tracker while moving through the virtual landscape. At step 710, an offset is determined, based on at least data captured by controller indicating a location on the LED wall. At step 712, it is defined by the controller, based on the determined offset whether an object at the indicated location on the LED wall should be removed or moved. At step 714, it is defined by the controller, based on the determined offset, whether a new object should be positioned at that location on the LED wall. At step 716, the controller determines, based on the determined offset, whether a note/message for other designers should be incorporated.

In an embodiment, the present specification provides a method of modifying in real time, data obtained via mocap techniques in relation to background imagery, into virtual character attributes. In embodiments, said attributes comprise parameters related to motion or performance which lead to triggering of events in the computational engine for driving simulations, such as but not limited to, animating atmospheric parameters in a scene. In embodiments, offset data comprises dimensional data that is analyzed in real time and is used to modify the mocap process by either instructing the actor to make one or more changes in position or by making a change in the characteristics of the attributes linking the mocap to one or more physical elements of the scene being shot, so that the offset is adjusted. In embodiments, the dimensional data comprises any type of tracking data which represents a positional relationship to a mocap actor's physiology, and is represented virtually with respect to the background imagery of the scene being shot. In an embodiment, the tracking data is transmitted as the virtual representation and usually results in a calibrated moving object or hierarchy (skeleton) simulating the actor, that is then retargeted to a corresponding object or character in the computational engine. In embodiments, the retargeting may correspond to the same object or character that corresponds to the tracking data or may also be used for mapping onto a different object or character. For example, the tracking data of an actor may be mapped onto a gorilla, zombie or giant.

In an exemplary, non-limiting scenario, it may be necessary to ensure that two actors in a video game level are of the same height, while in the real world one of the two actors is taller than the other. During the mocap-based shooting of the game level, a designer may realize that the shorter actor's head is tilted high in order to look at the taller actor in real life. The angle of tilt of the shorter actor's head may be determined in real time and the mocap head in the video game level may be corrected/adjusted to a desirable angle, thereby adjusting the position of the virtual head relative to the position of the physical actor's head.

Figure 8:
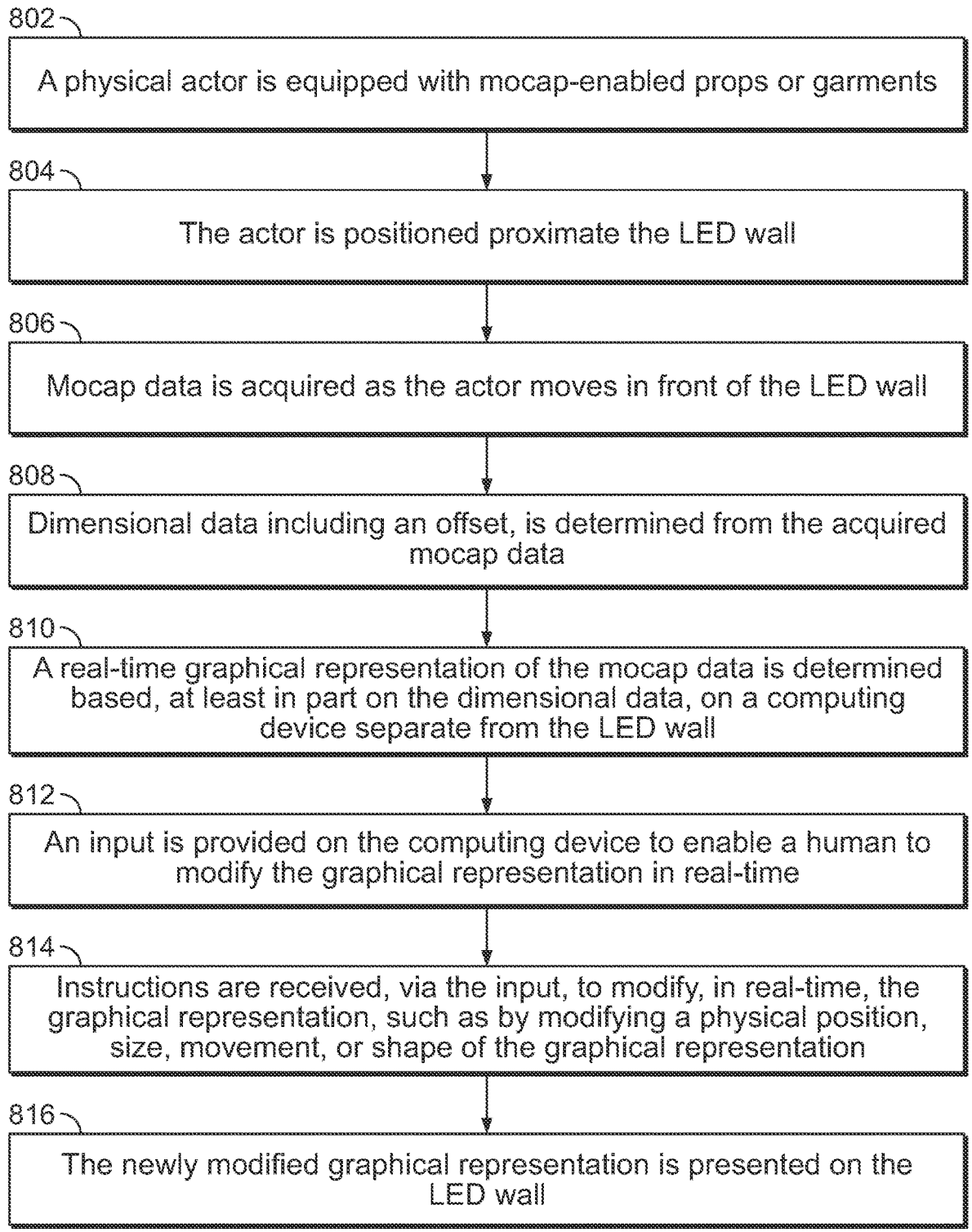
FIG. 8 is a flowchart detailing steps of a method for modifying, in real time, data obtained via mocap techniques in relation to background imagery into virtual character attributes, in accordance with an embodiment of the present specification.

FIG. 8 is a flowchart detailing steps of a method for modifying, in real time, data obtained via mocap techniques in relation to background imagery into virtual character attributes, in accordance with an embodiment of the present specification. At step 802, a physical actor is equipped with mocap-enabled props or garments. At step 804, the actor is positioned proximate to the LED wall. At step 806, mocap data is acquired as the actor moves in front of the LED wall. At step 808, dimensional data including offset, is determined from the acquired mocap data. At step 810 a real-time graphical representation of the mocap data determined based, at least in part on the dimensional data, is displayed on a computing device separate from the LED wall. At step 812, an input is provided on the computing device to enable a human to modify the graphical representation in real-time. At step 814, instructions are received on the computing device, via the input, to modify, in real-time, the graphical representation, such as by modifying a physical position, size, movement, or shape of the graphical representation. At step 816 the newly modified graphical representation is presented on the LED wall. In embodiments, the graphical representation may be presented in real-time on the LED wall, concurrent to the presentation on the computing device, and then replaced with the newly modified graphical representation or may be presented on the LED wall only after the graphical representation is modified. The above described process may occur concurrently or separately with respect to the modification of a virtual background in relation to one or more actors' fields of view, as described above.

In an embodiment, the present specification provides a method of creating pre-visualizations for video game cinematics and cut scenes which are short non-interactive clips that may be played before the commencement of video game levels, after the end of video game levels, or after the video game initially loads. Conventionally, in-game assets are used to create a rough mockup of the cinematic/cut scene. However, by using the method of the present specification, mocap, and LED walls-based virtual production stage(s), an intended cut scene may be efficiently and economically acted out by mocap actors, thereby saving the time required in using the in-game assets and post-production animation. It should be appreciated that the above described embodiments may be used to create 30 second clips, based on the mocap movement of physical actors and real-time adjustment of their captured imagery, that can then be readily incorporated into a video game as short non-interactive clips played before the commencement of levels, after the end of levels, or after the game initially loads.

In an embodiment, the present specification provides a method for enabling a virtual production stage to be used in presenting analysis/replays of e-sports gaming matches. In an embodiment, a presenter/reporter may be presented as stepping into a gaming level to explain an analysis of the gameplay. In an embodiment, a controller/processor operable by a user, coupled with a projector and an LED wall enables projection of a gameplay onto the LED wall. The processor also determines an offset to project a player position on the floor, thereby allowing a presenter/reporter to easily position him/herself relative to the LED Wall. In embodiments, the content on the LED wall may be displayed from a presenter's perspective which would provide the presenter with an immersive awareness of the positions of the mocap actors. In an embodiment, where a scene is shot via a broadcast camera, the camera drives the content displayed on the LED wall, and a presenter's position is required to be determined. In an embodiment, a relative position of an actor is projected on the floor before the LED volume by using a calibration process wherein the LED CG geometry is represented in the computational engine for a desired output to be rendered and displayed correctly. In embodiments, LED panels and LED projection screens have similar pipeline configuration in middleware/computational engine, with differences factored in for color/light control and increased emittance.

Hence, in various embodiments, the present specification provides a system and method for tracking data obtained from at least one actor's mocap helmet. The tracked data enables creation of a desired animation of objects/events relative to each of the actors during post-production processing. In various embodiments, the system and method of the present specification enables changing of the background projections on an LED wall from each actor's perspective rather than the camera's perspective. Further, in various embodiments, the present specification provides a system and method for modifying, in real-time, motion capture attributes based on an immediate review of each of the mocap actor's movements/position relative to gaming elements.

The above examples are merely illustrative of the many applications of the system and method of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A system adapted to generate video game content by modifying, in real-time, a virtual background displayed on a display wall from a perspective of a first physical actor and a second physical actor, comprising:
   a first set of motion capture tracking sensors coupled to the first physical actor;
   a second set of motion capture tracking sensors coupled to the second physical actor;
   a motion capture data acquisition system configured to capture a position and/or movement of the first physical actor to generate a first set of motion capture data and to capture a position and/or movement of the second physical actor to generate a second set of motion capture data;
   a first set of eyewear having a first polarity adapted to be worn by the first physical actor and a second set of eyewear having a second polarity adapted to be worn by the second physical actor, wherein the first polarity is different from the second polarity;
   a first computing engine configured to receive the first set of motion capture data and determine a first field of view of the first physical actor based at least in part on the first set of motion capture data and to receive the second set of motion capture data and determine a second field of view of the second physical actor based at least in part on the second set of motion capture data;

a display wall projection system, wherein the display wall is at least 60 feet wide and 18 feet tall and defines a third field of view and wherein the third field of view is larger than the first field of view and the second field of view; and a second computing engine configured to generate video game content for display and to transmit the video game content to the display wall projection system, wherein the first computing engine is further adapted to transmit the first field of view and the second field of view to the second computing engine and wherein the second computing engine is adapted to make a first set of changes to the video game content transmitted to the display wall projection system based on the first field of view and to make a second set of changes to the video game content transmitted to the display wall projection system based on the second field of view.

2. The system of claim 1, wherein the display wall projection system comprises a plurality of light emitting diode displays.

3. The system of claim 1, further comprising a motion capture headwear, wherein the motion capture tracking sensors are positioned on the headwear.

4. The system of claim 1, wherein the first field of view changes based on a distance of the first physical actor to the display wall projection system.

5. The system of claim 1, wherein the first set of changes to the video game content transmitted to the display wall projection system based on the first field of view is presented to the first physical actor within the first field of view and the second set of changes to the video game content transmitted to the display wall projection system based on the second field of view is presented to the second physical actor within the second field of view.

6. The system of claim 1, wherein the first set of changes is different than the second set of changes.

7. A method for generating video game content by modifying, in real-time, a virtual background displayed on a display wall from a perspective of a first physical actor and a second physical actor, comprising:

generating a first set of motion capture data by capturing a position and/or movement of the first physical actor;

generating a second set of motion capture data by capturing a position and/or movement of the second physical actor;

determining a first field of view of the first physical actor based at least in part on the first set of motion capture data;

determining a second field of view of the second physical actor based on the second set of motion capture data;

generating video game content for display by making a first set of changes to the video game content being transmitted to a display wall based on the first field of view, wherein the display wall defines a third field of view and wherein the third field of view is larger than the first field of view;

generating video game content for display by making a second set of changes to the video game content being transmitted to the display wall based on the second field of view;

presenting the first physical actor with the first set of changes in the video game content corresponding to the first physical actor's field of view, wherein said changes are unique for the first physical actor; and presenting the second physical actor with the second set of changes in the video game content corresponding to the second field of view.

8. The method of claim 7, wherein the first and the second set of motion capture data is generated by one or more motion capture tracking sensors coupled to the first and the second physical actors respectively.

9. The method of claim 8, wherein the motion capture tracking sensors are positioned on a headwear of the first and the second physical actors.

10. The method of claim 7, wherein the display wall projection system comprises a plurality of light emitting diode displays.

11. The method of claim 7, wherein the first field of view changes based on a distance of the first physical actor to the display wall.

12. The method of claim 7, wherein the first field of view and second field of view are different and are both less than the second third field of view.

13. The method of claim 7, wherein the first set of changes is different than the second set of changes.

14. The method of claim 7, further comprising having the first physical actor wear a first set of eyewear having a first polarity and the second physical actor wear a second set of eyewear having a second polarity, wherein the first polarity is different from the second polarity.

* * * * *